(12) United States Patent
Cao

(10) Patent No.: US 11,991,121 B2
(45) Date of Patent: May 21, 2024

(54) ELECTRONIC DEVICE AND METHOD USED FOR WIRELESS COMMUNICATION, AND COMPUTER-READABLE STORAGE MEDIUM

(71) Applicant: Sony Group Corporation, Tokyo (JP)

(72) Inventor: Jianfei Cao, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 436 days.

(21) Appl. No.: 17/293,039

(22) PCT Filed: Dec. 27, 2019

(86) PCT No.: PCT/CN2019/129098
§ 371 (c)(1),
(2) Date: May 12, 2021

(87) PCT Pub. No.: WO2020/140836
PCT Pub. Date: Jul. 9, 2020

(65) Prior Publication Data
US 2021/0399865 A1    Dec. 23, 2021

(30) Foreign Application Priority Data
Jan. 3, 2019  (CN) .......................... 201910004300.X

(51) Int. Cl.
*H04W 52/02*    (2009.01)
*H04L 5/00*    (2006.01)
(52) U.S. Cl.
CPC .......... *H04L 5/0098* (2013.01); *H04L 5/0048* (2013.01); *H04W 52/0274* (2013.01)

(58) Field of Classification Search
CPC .......... H04W 52/0274; H04W 72/085; H04W 72/042; H04W 72/0456; H04W 72/1226;
(Continued)

(56) References Cited

U.S. PATENT DOCUMENTS 9,369,996 B2 *  6/2016  Higuchi ................. H04B 7/061
9,603,169 B2 *  3/2017  Kim ...................... H04L 5/0094
(Continued)

FOREIGN PATENT DOCUMENTS

| CN | 108112075 A | 6/2018 |
|---|---|---|
| CN | 108391315 A | 8/2018 |
| WO | 2018/126474 A1 | 7/2018 |

OTHER PUBLICATIONS

Catt: "Enhancements on multi-beam operation", 3GPP TSG RAN WG1 Meeting #95, R1-1812636, Nov. 2018, XP051554592.
(Continued)

*Primary Examiner* — Jean A Gelin
(74) *Attorney, Agent, or Firm* — XSENSUS LLP

(57) ABSTRACT

Provided by the present disclosure are an electronic device and method used for wireless communication, and a computer-readable storage medium, the electronic device comprising: a processing circuit that is configured to: acquire from a base station information that is allocated by the base station for a user equipment (UE) and that is used for a beam management sounding reference signal (SRS) resource set; and, according to a pre-determined rule, determine an antenna panel of a UE corresponding to the SRS resource set indicated by the information, wherein the pre-determined rule limits the mapping between SRS resource sets used for beam management and antenna panels of UEs.

19 Claims, 11 Drawing Sheets

(58) Field of Classification Search
CPC ... H04L 5/0023; H04L 5/0048; H04L 5/0094; H04L 5/0098
See application file for complete search history.

(56) References Cited

U.S. PATENT DOCUMENTS

| | | | | |
|---|---|---|---|---|
| 10,735,072 | B2* | 8/2020 | Kwak | H04B 7/0456 |
| 2009/0247229 | A1* | 10/2009 | Teo | H04B 7/0691 |
| | | | | 455/562.1 |
| 2012/0014349 | A1* | 1/2012 | Chung | H04W 72/0453 |
| | | | | 370/329 |
| 2015/0043438 | A1* | 2/2015 | Fwu | H04W 16/26 |
| | | | | 370/329 |
| 2015/0381246 | A1* | 12/2015 | Huang | H04B 7/0617 |
| | | | | 370/329 |
| 2016/0269157 | A1* | 9/2016 | Soriaga | H04L 5/0048 |
| 2017/0208568 | A1* | 7/2017 | Nam | H04W 72/23 |
| 2017/0264409 | A1* | 9/2017 | Guo | H04B 7/0413 |
| 2018/0206132 | A1* | 7/2018 | Guo | H04B 7/0695 |
| 2019/0190582 | A1* | 6/2019 | Guo | H04L 1/0061 |
| 2019/0306850 | A1* | 10/2019 | Zhang | H04B 7/0626 |
| 2019/0312616 | A1* | 10/2019 | Christoffersson | H04B 7/0456 |
| 2019/0372734 | A1* | 12/2019 | Choi | H04B 7/0628 |
| 2020/0288488 | A1* | 9/2020 | Park | H04W 76/28 |
| 2021/0058209 | A1* | 2/2021 | Qin | H04L 5/0023 |
| 2021/0083825 | A1* | 3/2021 | Choi | H04L 1/06 |
| 2021/0120500 | A1* | 4/2021 | Zhou | H04W 52/34 |
| 2021/0351960 | A1* | 11/2021 | Huang | H04W 72/23 |
| 2021/0384955 | A1* | 12/2021 | Varatharaajan | H04B 7/0695 |
| 2022/0116979 | A1* | 4/2022 | Park | H04L 5/0044 |
| 2022/0167274 | A1* | 5/2022 | Wang | H04W 52/0235 |

OTHER PUBLICATIONS

Nokia et al: "Enhancements on Multi-beam Operation", 3GPP TSG RAN WG1 Meeting #95, R1-1813490, Nov. 2018, XP051555546.
International Search Report and Written Opinion dated Feb. 27, 2020, received for PCT Application PCT/CN2019/129098, Filed on Dec. 27, 2019, 9 pages including English Translation.
Fraunhofer Iis et al., "Enhancements on UE Multi-Beam Operation", 3GPP TSG RAN WG1 Meeting #95, R1-1813132, Nov. 12-16, 2018, 5 pages.

* cited by examiner

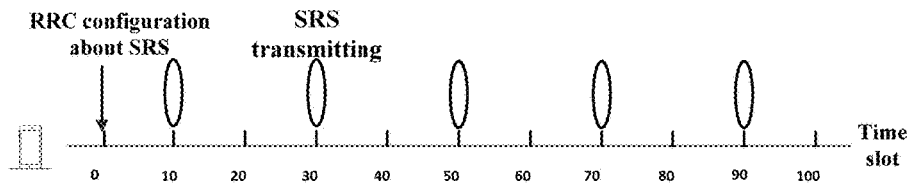
Figure 4
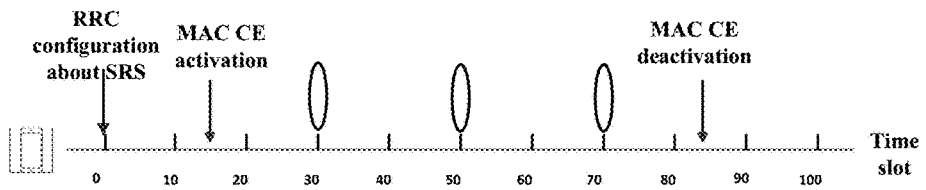
Figure 5
| A/D | SRS resource set ID | BWP ID of SRS resource set | Oct1 |
|-----|---------------------|----------------------------|------|
| A/D | SRS resource set ID | BWP ID of SRS resource set | Oct2 |
| A/D | SRS resource set ID | BWP ID of SRS resource set | Oct3 |
| A/D | SRS resource set ID | BWP ID of SRS resource set | Oct4 |
Figure 6
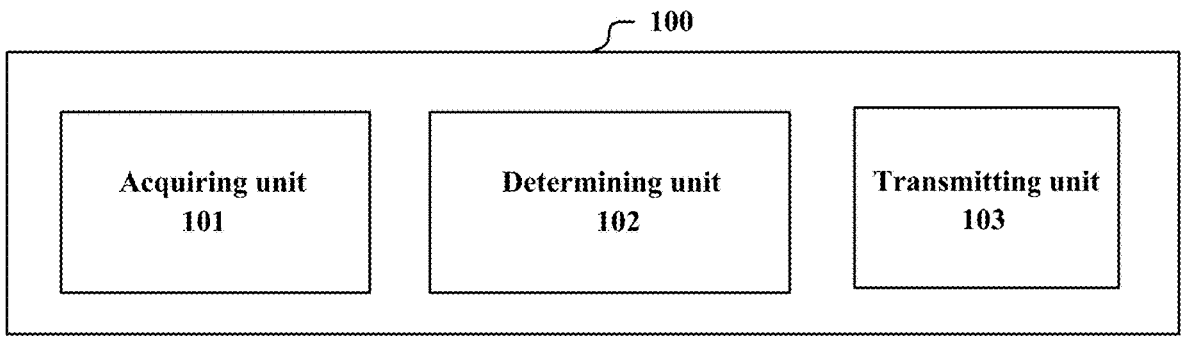
Figure 7

| Serial number of CSI report | CSI field |
|---|---|
| CSI report #n | CRI #1, if reported |
| | CRI #2, if reported |
| | CRI #3, if reported |
| | CRI #4, if reported |
| | RSRP #1, if reported |
| | Differential RSRP#2, if reported |
| | Differential RSRP#3, if reported |
| | Differential RSRP #4, if reported |
| | SRS resource set ID #10, SRS resource set ID #18 |
| | SRS resource set ID #18 |
| | SRS resource set ID #21 |
| | SRS resource set ID #10, SRS resource set ID #21 |

ELECTRONIC DEVICE AND METHOD USED FOR WIRELESS COMMUNICATION, AND COMPUTER-READABLE STORAGE MEDIUM

CROSS-REFERENCE TO RELATED APPLICATIONS

This application is based on PCT filing PCT/CN2019/129098, filed Dec. 27, 2019, which claims priority to Chinese Patent Application No. 201910004300.X, titled "ELECTRONIC DEVICE AND METHOD USED FOR WIRELESS COMMUNICATION, AND COMPUTER-READABLE STORAGE MEDIUM", filed on Jan. 3, 2019 with the China National Intellectual Property Administration, each of which is incorporated herein by reference in its entirety.

FIELD

The present disclosure relates to the technical field of wireless communications, in particular to uplink beam management in a wireless communication system, and more in particular to an electronic apparatus and a method for wireless communications, and a computer-readable storage medium.

BACKGROUND

With the development of wireless communication technology, communication terminals such as user equipment (UE) may have multiple antenna panels, and each of the multiple antenna panels may form beams in different spatial directions. Within a time unit, each antenna panel may only emit beams in one direction, and the multiple antenna panels may emit beams simultaneously. Therefore, a base station may configure multiple sounding reference signal (SRS) resource sets for the UE for the purpose of uplink beam management.

FIG. 1 is a schematic diagram showing UE having 4 antenna panels. SRS resource sets required for uplink beam scanning are allocated to the 4 antenna panels respectively. Each of the SRS resource sets includes N SRS resources. FIG. 2 is a schematic diagram of performing uplink beam scanning utilizing the SRS resource sets allocated in FIG. 1. It can be seen that on a same OFDM symbol, the 4 antenna panels emit beams in 4 directions respectively.

SUMMARY

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

An electronic apparatus for wireless communications is provided according to an aspect of the present disclosure. The electronic apparatus includes processing circuitry, which is configured to: acquire, from a base station, information of an SRS resource set for beam management configured by the base station for user equipment; and determine, based on a predetermined rule, an antenna panel of the user equipment corresponding to the SRS resource set indicated by the information. The predetermined rule defines a mapping relationship between SRS resource sets for beam management and antenna panels of the user equipment.

A method for wireless communications is provided according to another aspect of the present disclosure. The method includes: acquiring, from a base station, information of an SRS resource set for beam management configured by the base station for user equipment; and determining, based on a predetermined rule, an antenna panel of the user equipment corresponding to the SRS resource set indicated by the information, where the predetermined rule defines a mapping relationship between SRS resource sets for beam management and antenna panels of the user equipment.

An electronic apparatus for wireless communications is provided according to an aspect of the present disclosure. The electronic apparatus includes processing circuitry, which is configured to: generate information of an SRS resource set for beam management configured for user equipment, where there is mapping relationship defined by a predetermined rule between the SRS resource set indicated by the information and an antenna panel of the user equipment; and transmit the information to the user equipment.

A method for wireless communications is provided according to another aspect of the present disclosure. The method includes: generating information of an SRS resource set for beam management configured for user equipment, where there is a mapping relationship defined by a predetermined rule between the SRS resource set indicated by the information and an antenna panel of the user equipment; and transmitting the information to the user equipment.

An electronic apparatus for wireless communications is provided according to an aspect of the present disclosure. The electronic apparatus includes processing circuitry, which is configured to: determine, based on a predetermined rule, an SRS resource set for beam management corresponding to a particular antenna panel of user equipment, where the predetermined rule defines a mapping relationship between SRS resource sets for beam management and antenna panels of the user equipment; and transmit information of the determined SRS resource set to the base station.

A method for wireless communications is provided according to another aspect of the present disclosure. The method includes: determining, based on a predetermined rule, an SRS resource set for beam management corresponding to a particular antenna panel of user equipment, where the predetermined rule defines a mapping relationship between SRS resource sets for beam management and antenna panels of the user equipment; and transmitting information of the determined SRS resource set to the base station.

An electronic apparatus for wireless communications is provided according to an aspect of the present disclosure. The electronic apparatus includes processing circuitry, which is configured to: acquire, from user equipment, information of an SRS resource set for beam management; and determine, based on a predetermined rule, an antenna panel of user equipment corresponding to the SRS resource set indicated by the information, where the predetermined rule defines a mapping relationship between SRS resource sets for beam management and antenna panels of the user equipment.

A method for wireless communications is provided according to another aspect of the present disclosure. The method includes: acquiring, from user equipment, information of an SRS resource set for beam management; and determining, based on a predetermined rule, an antenna panel of the user equipment corresponding to the SRS resource set indicated by the information, where the predetermined rule defines a mapping relationship between SRS resource sets for beam management and antenna panels of the user equipment.

According to other aspects of the present disclosure, there are further provided computer program codes and computer program products for implementing the methods for wireless communications above, and a computer readable storage medium having recorded thereon the computer program codes for implementing the methods for wireless communications described above.

With the electronic apparatuses and the methods according to embodiments of the present disclosure, the mapping relationship between the SRS resource sets and the antenna panels of the UE is defined based on a predetermined rule, so that the base station can acquire knowledge of, for each antenna panel of the UE, which SRS resource set is utilized in particular, in a deterministic manner.

These and other advantages of the present disclosure will be more apparent by illustrating in detail a preferred embodiment of the present disclosure in conjunction with accompanying drawings below.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present disclosure and should not be construed as a limitation to the scope of the disclosure.

In the accompanying drawings:

FIG. 4 is a schematic diagram of performing SRS transmitting based on RRC configuration;

FIG. 5 is a schematic diagram of performing SRS transmitting through MAC CE for activation;

FIG. 6 shows an example of MAC CE for activating or deactivating an antenna panel;

FIG. 7 is a block diagram showing functional modules of an electronic apparatus for wireless communications according to an embodiment of the present disclosure;

DETAILED DESCRIPTION OF EMBODIMENTS

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

First Embodiment

Figure 1:
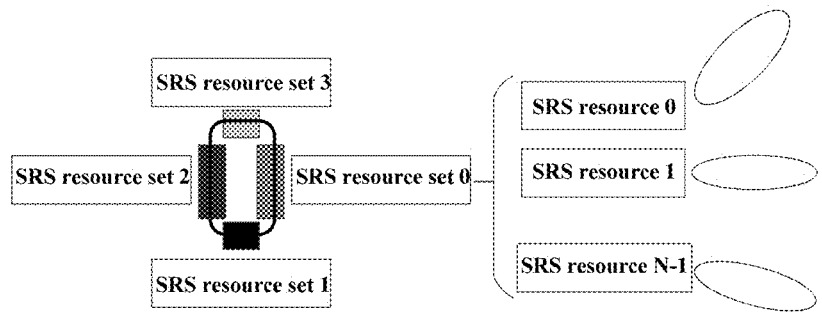
FIG. 1 is a schematic diagram showing a UE having 4 antenna panels.
Figure 2:
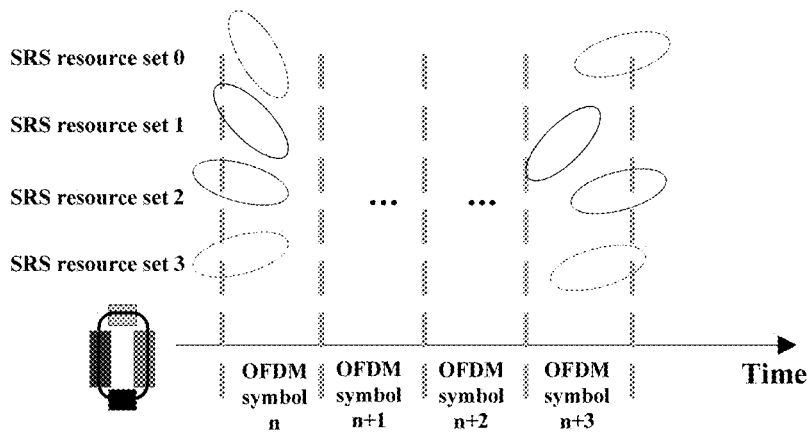
FIG. 2 is a schematic diagram showing performing uplink beam scanning utilizing SRS resource sets allocated in FIG. 1.
Figure 3:
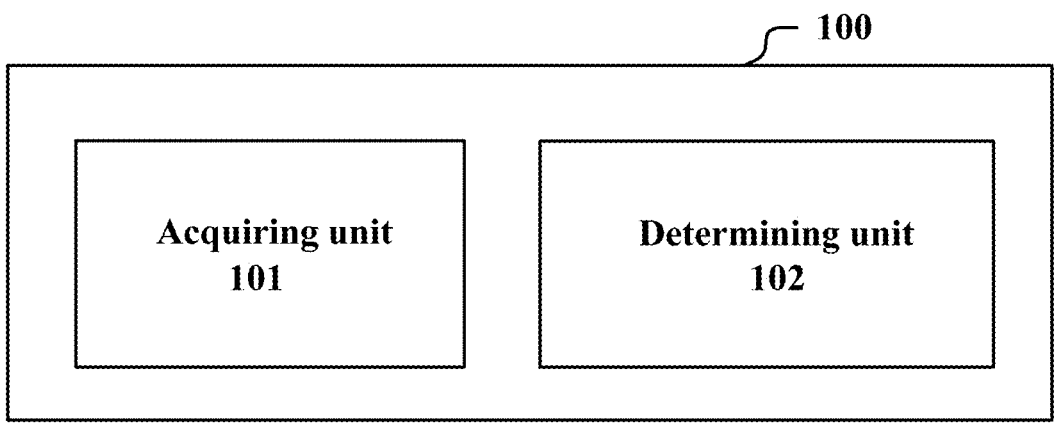
FIG. 3 is a block diagram showing functional modules of an electronic apparatus for wireless communications according to an embodiment of the present disclosure.

FIG. 3 is a block diagram showing functional modules of an electronic apparatus 100 for wireless communications according to an embodiment of the present disclosure. As shown in FIG. 3, the electronic apparatus 100 includes an acquiring unit 101 and a determining unit 102. The acquiring unit 101 is configured to acquire, from a base station, information of an SRS resource set for beam management configured by the base station for user equipment (UE). The determining unit 102 is configured to determine, based on a predetermined rule, an antenna panel of the UE corresponding to the SRS resource set indicated by the information. The predetermined rule defines a mapping relationship between the SRS resource set for beam management and the antenna panel of the UE.

The acquiring unit 101 and the determining unit 102 may be implemented by one or more processing circuitries. The processing circuitry may be implemented as, for example, a chip or a processor. In addition, it should be understood that various functional units in the apparatus shown in FIG. 3 are just logical modules divided based on functions implemented by these functional units, and are not intended to limit the specific implementations, which is also applicable to examples of other electronic apparatus described subsequently.

The electronic apparatus 100, for example, may be arranged at a side of the user equipment (UE) or may be communicatively connected to the UE. Here, it should be further noted that the electronic apparatus 100 may be implemented at a chip level, or may be implemented at an apparatus level. For example, the electronic apparatus 100 may operate as the user equipment itself, and may further include external apparatuses such as a memory and a transceiver (not shown in the drawings). The memory may be configured to store programs required to be executed by the user equipment and related data information for implementing various functions. The transceiver may include one or more communication interfaces to support communication with different apparatuses (such as a base station, and other user equipment). An implementation form of the transceiver is not specifically limited herein. This also applies to subsequent description of other configuration examples of the electronic apparatus at the side of the user equipment.

In the Rel.15 standard, the association relationship between the SRS resource sets and the antenna panels of the UE, that is, which antenna panel utilizing which SRS resource set, is implemented by the UE by itself, and is unknown to the base station. In this embodiment, the mapping relationship between the SRS resource sets and the antenna panels of the UE is determined by using the predetermined rule, so that the base station can acquire knowledge of the association relationship between the SRS resource sets and the antenna panels of the UE, so as to achieve more accurate uplink beam management.

For example, the acquiring unit 101 may acquire the above mentioned information through radio resource control (RRC) signaling. The UE can report its beam capability, for example, information of the configured antenna panels, by reporting UE capability. The base station configures an SRS resource set for beam management for the antenna panel through the RRC signaling.

For ease of understanding, FIG. 4 shows a schematic diagram of performing SRS transmitting through RRC configuration, where a transmitting period is 20 time slots and an offset is 10 time slots. Therefore, the UE, utilizing the configured SRS resource set, starts SRS transmission at the 10th time slot after a time slot in which the UE receives the RRC configuration. In addition, as shown in FIG. 5, the UE may perform SRS transmission utilizing configured SRS resources after receiving MAC CE for activation from the base station, and stop the SRS transmission after receiving MAC CE for deactivation from the base station, where a transmission period is also 20 time slots.

It should be understood that, in order to save resources, the base station may configure, for the UE, SRS resource sets the number of which is smaller than the number of antenna panels of the UE. That is, the UE performs the SRS transmission utilizing only a part of the antenna panels. In order to enable the base station to determine by which antenna panel of the UE the received SRS signal is transmitted, a predetermined rule is set as a reference for the base station in this embodiment.

In an example, the predetermined rule may include: mapping an SRS resource set with a small identifier (ID) to an antenna panel with a small identifier. For example, the UE has 4 antenna panels (respectively represented as panel 0 to 3). The SRS resource sets configured by the base station for the UE are SRS resource set 10, SRS resource set 18, SRS resource set 21, and SRS resource set 29, respectively. Based on the predetermined rule, the association (or mapping) may be set as follows. The SRS resource set 10 corresponds to the panel 0, the SRS resource set 18 corresponds to the panel 1, the SRS resource set 21 corresponds to the panel 2, and the SRS resource set 29 corresponds to the panel 3.

In a case that the number of SRS resource sets allocated by the base station is smaller than 4, for example, the base station allocates only 2 SRS resource sets, the association (or mapping) may be set as follows. The SRS resource set 10 corresponds to the panel 0, the SRS resource set 18 corresponds to the panel 1, and no resource sets correspond to the panel 2 and the panel 3.

In this case, the base station can accurately determine, based on the predetermined rule, the received SRS signal is from which antenna panel of the UE. It should be understood that the foregoing is only an example of the predetermined rule, and this example is not restrictive, and other appropriate predetermined rules may be adopted.

In addition, an ON/OFF state of the antenna panel of the UE may be changed over time. For example, the base station may control each antenna panel of the UE to be on or off in various ways. In an example, the determining unit 102 may further be configured to change the ON/OFF state of each antenna panel based on the above information of SRS resource set. The ON/OFF state of the antenna panel may be changed periodically, semi-statically or aperiodically. Correspondingly, the configuration of the SRS resource set may also be periodically, semi-statically or aperiodically.

For example, the acquiring unit 101 may be configured to periodically acquire the information, so that the determining unit 102 may be configured to periodically change the ON/OFF state of each antenna panel based on the information, for example, turning on or off a particular antenna panel of the UE. In the foregoing example where the UE has 4 antenna panels and the number of configured SRS resource sets decreases from 4 (that is, the SRS resource sets 10, 18, 21, and 29) to 2 (that is, the SRS resource sets 10 and 18), the antenna panels 2 and 3 are turned off.

In addition, the acquiring unit 101 may be further configured to acquire the MAC CE from the base station to activate or deactivate the antenna panel corresponding to the SRS resource set indicated by the information. This manner is called a semi-static manner, as shown in FIG. 5. The MAC CE may include information of the ID of the SRS resource set. The UE changes the ON/OFF state of the antenna panel corresponding to the ID. For example, the UE turns the antenna panel to be off in a case that it is currently in the on state, and turns the antenna panel to be on in a case that it is currently in the off state. FIG. 6 shows an example of MAC CE for activating or deactivating an antenna panel. The MAC CE includes an ID of an SRS resource set and an ID of a bandwidth part (BWP) to which the SRS resource set belongs.

Alternatively, the determining unit 102 may be configured to change the ON/OFF state of the antenna panel corresponding to the SRS resource set indicated by the information based on downlink control information (DCI). This manner is called an aperiodic manner. For example, in the case that the UE has 4 antenna panels, the determining unit 102 may change an ON/OFF state of one of the 4 antenna panels using 2-bit information in the DCI.

On the other hand, the UE itself may control the ON/OFF state of its antenna panel. In this case, the electronic apparatus 100 may further include a transmitting unit 103 configured to notify the base station of the change of the ON/OFF state of the antenna panel of the UE, as shown in FIG. 7. For example, the transmitting unit 103 is configured to transmit a request for configuring an SRS resource set for beam management to the base station, in a case that a particular antenna panel is turned on, and transmit a request for releasing the SRS resource set corresponding to the particular antenna panel to the base station in a case that the particular antenna panel is turned off.

These requests may each include an identifier of the SRS resource set that has a mapping relationship with the particular antenna panel. The identifier, for example, may be acquired based on a stored historical mapping relationship between the SRS resource set and the antenna panel. These requests may be transmitted to the base station through the RRC signaling.

In addition, the transmitting unit 103 may further be configured to transmit a request for activating the SRS resource set for beam management to the base station in the case that the particular antenna panel is turned on, and transmit a request for deactivating the SRS resource set corresponding to the particular antenna panel to the base station in the case that the particular antenna panel is turned off. These requests may be transmitted through MAC signaling. Similarly, these requests may each include the identifier of the SRS resource set that has a mapping relationship with the particular antenna panel.

According to this aspect of the present disclosure, the identifier of the SRS resource set is used as an indication to notify the base station to configure the SRS resources, so that the base station can acquire knowledge of a switching operation performed by the UE on a particular antenna panel.

In summary, the electronic apparatus 100 according to this embodiment determines the mapping relationship between the SRS resource sets and the antenna panels of the UE based on the predetermined rule, so that the base station can acquire knowledge of, for each antenna panel of the UE, which SRS resource set is utilized in particular, in a deterministic manner, thereby achieving more accurate and effective beam management.

Second Embodiment

Figure 8:
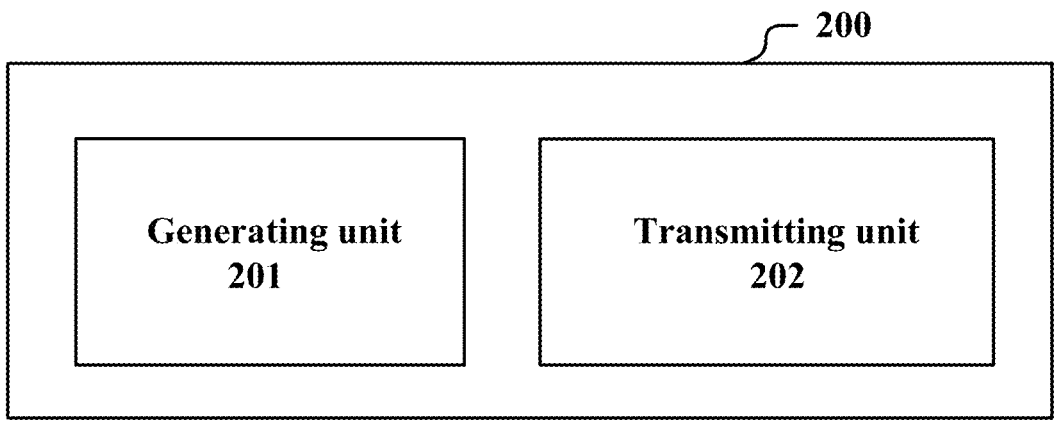
FIG. 8 is a block diagram showing functional modules of an electronic apparatus for wireless communications according to another embodiment of the present disclosure.

FIG. 8 is a block diagram showing functional modules of an electronic apparatus 200 according to another embodiment of the present disclosure. As shown in FIG. 8, the electronic apparatus 200 includes a generating unit 201 and a transmitting unit 202. The generating unit 201 is configured to generate information of an SRS resource set configured for UE for beam management. There is a mapping relationship defined by a predetermined rule between the SRS resource set indicated by the information and an antenna panel of the UE. The transmitting unit 202 is configured to transmit the information to the UE.

The generating unit 201 and the transmitting unit 202 may be implemented by one or more processing circuitries. The processing circuitry may be implemented as, for example, a chip or a processor. In addition, it should be understood that various functional units in the apparatus shown in FIG. 8 are just logical modules divided based on functions implemented by these functional units, and are not intended to limit the specific implementations, which is also applicable to examples of other electronic apparatus described subsequently.

The electronic apparatus 200, for example, may be arranged at a side of a base station or may be communicatively connected to a base station. The base station described in the present disclosure may also be a transmit receive point (TRP) or an access point (AP). Here, it should further be noted that the electronic apparatus 200 may be implemented at a chip level, or may be implemented at an apparatus level. For example, the electronic apparatus 100 may operate as the base station itself, and may further include external apparatuses such as a memory and a transceiver (not shown in the drawings). The memory may be configured to store programs required to be executed by the base station and related data information for implementing various functions. The transceiver may include one or more communication interfaces to support communication with different apparatuses (such as user equipment, and another base station). An implementation form of the transceiver is not specifically limited herein. This also applies to subsequent description of other configuration examples of the electronic apparatus at the side of the base station.

Since there is a mapping relationship defined by a predetermined rule between the SRS resource set and the antenna panel of the UE, the base station can determine, based on the predetermined rule, which antenna panel of the UE each SRS resource set would be associated with, thereby achieving antenna panel-specific beam management.

The predetermined rule includes, for example, mapping an SRS resource set with a small identifier to an antenna panel with a small identifier. Specific examples have been given in the first embodiment and are not repeated here. Further, it should be understood that the predetermined rule is not limited thereto, and may be appropriately modified or changed.

In an example, the transmitting unit 202 may transmit the information through RRC signaling.

As described in the first embodiment, this information may be used to change an ON/OFF state of each antenna panel. Depending on time domain attributes, the ON/OFF state of each antenna panel may be changed periodically, semi-statically or aperiodically.

For example, the transmitting unit 202 may periodically transmit the information, so as to change of the ON/OFF state of the antenna panel periodically. Alternatively, in addition to the RRC signaling, the transmitting unit 202 may instruct, through the MAC CE, the UE to activate or deactivate the antenna panel corresponding to the SRS resource set indicated by the information, so as to semi-statically control the ON/OFF state of the antenna panel. The MAC CE may further include an ID of an SRS resource set corresponding to an antenna panel whose ON/OFF state is to be changed, as shown in FIG. 6, for example.

In addition, the transmitting unit 202 may instruct, through DCI, the UE to change the ON/OFF state of the antenna panel corresponding to the SRS resource set indicated by the information. This manner is an aperiodic control manner. For example, in the case that the UE has 4 antenna panels, the transmitting unit 202 may indicate an ON/OFF state of which antenna panel is to be changed through the 2-bit information in the DCI.

In summary, the electronic apparatus 200 according to the present disclosure can acquire knowledge of, for each antenna panel of the UE, which SRS resource set is utilized in particular, in a deterministic manner based on a predetermined rule commonly known by the base station and the UE, thereby achieving more accurate and effective beam management.

Third Embodiment

Figure 9:
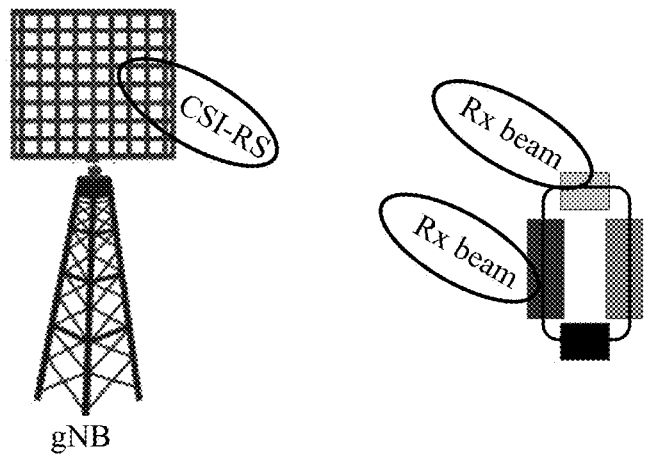
FIG. 9 is a schematic diagram showing performing downlink beam scanning by a base station utilizing a channel state information reference signal (CSI-RS)

In a case that uplink and downlink channels have beam symmetry, for example, in a time division duplexing (TDD) system, the base station may perform uplink beam management based on a downlink reference signal. As shown in FIG. 9, the base station utilizes a channel state information reference signal (CSI-RS) as a reference signal for beam scanning. The UE performs receiving by utilizing two receiving (Rx) beams of the antenna panel, and reports an ID of the CSI-RS resource, that is, CRI. After receiving the report, the base station can acquire knowledge of an appropriate emitting beam. If the base station can also acquire related information indicating which antenna panel the UE utilizes for receiving, the base station may configure the SRS resource set for beam management accordingly.

Figure 10:
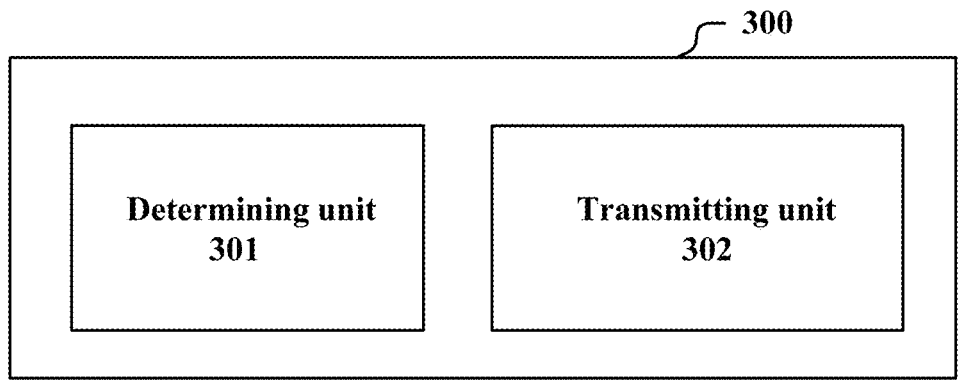
FIG. 10 is a block diagram showing functional modules of an electronic apparatus for wireless communications according to another embodiment of the present disclosure.

FIG. 10 is a block diagram showing functional modules of an electronic apparatus 300 for wireless communications according to this embodiment. As shown in FIG. 10, the electronic apparatus 300 includes a determining unit 301 and a transmitting unit 302. The determining unit 301 is configured to determine, based on a predetermined rule, an SRS resource set for beam management corresponding to a particular antenna panel of UE. The predetermined rule defines a mapping relationship between the SRS resource sets for beam management and the antenna panels of the UE. The transmitting unit 302 is configured to transmit information of the determined SRS resource set to the base station.

The determining unit 301 and the transmitting unit 302 may be implemented by one or more processing circuitries. The processing circuitry may be implemented as, for example, a chip or a processor. The electronic apparatus 300, for example, may be arranged at a side of user equipment (UE) or may be communicatively connected to UE.

The predetermined rule may include, for example, mapping an SRS resource set with a small identifier to an antenna panel with a small identifier. The determining unit 301 may determine, based on the predetermined rule, the SRS resource set corresponding to the particular antenna panel. The base station may acquire the same mapping relationship based on the predetermined rule, so that the can determine which of the antenna panels the particular antenna panel of the UE is, upon receipt of the information of the SRS resource set. Here, the information of the SRS resource set may be an identifier (ID) of the SRS resource set. In a case of there being multiple particular antenna panels, the information may include IDs of multiple SRS resource sets.

In an example, the determining unit 301 may perform the determining based on an SRS resource set in historical configuration. The historical configuration includes, for example, an ID of an SRS resource set recently configured by the base station for the UE.

The determining unit 301 may further be configured to determine a particular antenna panel based on a measurement result for the downlink reference signal. The transmitting unit 302 may be configured to include an identifier of the SRS resource set corresponding to the determined particular antenna panel in a measurement report of the downlink reference signal and transmit the identifier to the base station. The downlink reference signal is, for example, the previously mentioned CSI-RS signal or a synchronization signal block (SSB).

Figures 11, 12:
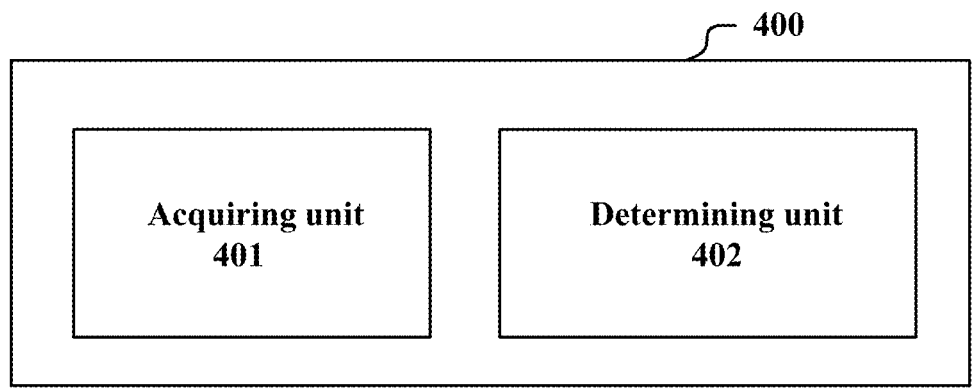
FIG. 11 shows a diagram of an example of a measurement report for a downlink reference signal transmitted by UE in a case that the downlink reference signal is a CSI-RS.
FIG. 12 is a block diagram showing functional modules of an electronic apparatus for wireless communications according to another embodiment of the present disclosure.

FIG. 11 shows a diagram of an example of a measurement report for a downlink reference signal transmitted by the UE in a case that the downlink reference signal is a CSI-RS. In the measurement report, the 1st to 4th rows show IDs of CSI-RS resources, that is, CRIs, corresponding to four emitting beams that are reported, respectively. The 5th to 8th rows show reference signal receiving power (RSRP) of the CSI-RS resources shown in the 1st to 4th rows, respectively. The 9th to 12th rows show identifiers of SRS resource sets corresponding to antenna panels at which receiving beams with best reception effect for the emitting beams shown in the 1st to 4th rows are located, respectively. It can be seen that, for one emitting beam, there may be multiple optimal receiving beams and these receiving beams may belong to different antenna panels. In this case, IDs of SRS resource sets respectively corresponding to the multiple antenna panels are to be included in the measurement report, as shown in the 9th and 12th rows in FIG. 11.

FIG. 11 only shows an example of the measurement report for the downlink reference signal, which is not restrictive, and the form and content of the report may be changed appropriately. Upon receipt of the measurement report, the base station may determine, based on the content in the last four rows, a corresponding antenna panel using the predetermined rule, and configure an SRS resource set for the UE based on the determined antenna panel.

Correspondingly, an electronic apparatus 400 at a side of the base station is further provided according to this embodiment. As shown in FIG. 12, the electronic apparatus 400 includes an acquiring unit 401 and a determining unit 402. The acquiring unit 401 is configured to acquire, from the UE, the information of the SRS resource set for beam management. The determining unit 402 is configured to determine, based on the predetermined rule, an antenna panel of the UE corresponding to the SRS resource set indicated by the information. The predetermined rule defines a mapping relationship between the SRS resource sets for beam management and the antenna panels of the UE.

The acquiring unit 401 and the determining unit 402 may be implemented by one or more processing circuitries. The processing circuitry may be implemented as, for example, a chip or a processor.

Similarly, for example, the predetermined rule may include mapping an SRS resource set with a small identifier to an antenna panel with a small identifier.

The information is, for example, included in the measurement report for the downlink reference signal reported by the UE, and the information is the identifier of the SRS resource set. The downlink reference signal is, for example, a CSI-RS or SSB. The determining unit 402 may determine, for example, according to an SRS resource set historically configured for the UE, the corresponding antenna panel using the predetermined rule.

In addition, the determining unit 402 may further be configured to configure an SRS resource set for the UE based on the determined antenna panel.

In summary, the electronic apparatuses 300 and 400 according to this embodiment can achieve delivery of information about the particular antenna panel between the UE and the base station through the information of the SRS resource set based on the predetermined rule, thereby realizing uplink beam management based on the downlink reference signal.

Fourth Embodiment

In the above description of embodiments of the electronic apparatuses for wireless communications, it is apparent that some processing and methods are further disclosed. In the following, a summary of the methods are described without repeating details that are described above. However, it should be noted that although the methods are disclosed when describing the electronic apparatuses for wireless communications, the methods are unnecessary to adopt those components or to be performed by those components described above. For example, implementations of the electronic apparatuses for wireless communications may be partially or completely implemented by hardware and/or firmware. Methods for wireless communications to be discussed blow may be completely implemented by computer executable programs, although these methods may be implemented by the hardware and/or firmware for implementing the electronic apparatuses for wireless communications.

Figure 13:
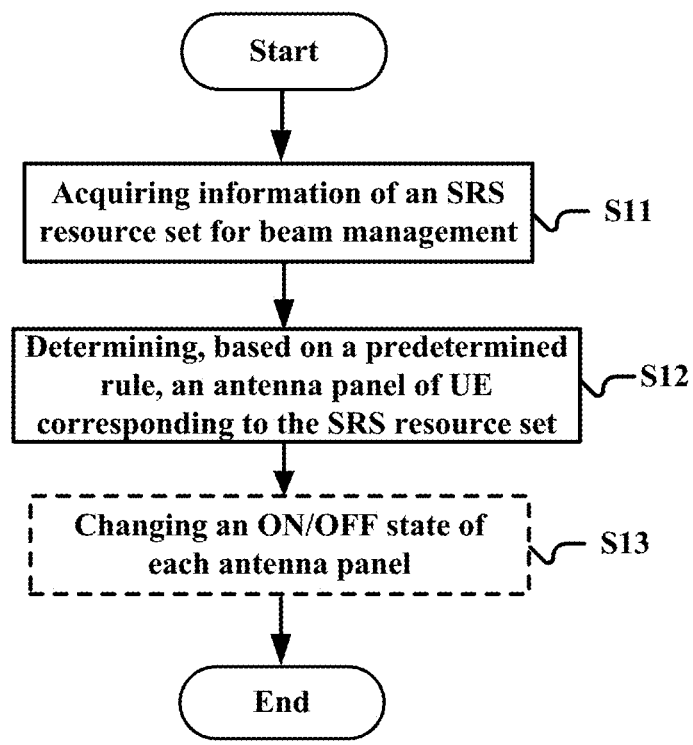
FIG. 13 shows a flowchart of a method for wireless communications according to an embodiment of the present disclosure.

FIG. 13 is a flowchart of a method for wireless communications according to an embodiment of the present disclosure. The method includes: acquiring, from a base station, information of an SRS resource set for beam management configured by the base station for UE (S11); and determining, based on a predetermined rule, an antenna panel of the UE corresponding to the SRS resource set indicated by the information (S12), where the predetermined rule defines a mapping relationship between SRS resource sets for beam management and antenna panels of the UE. This method may be performed at a side of the UE.

For example, in step S11, the information may be acquired through RRC signaling. The predetermined rule may include: mapping an SRS resource set with a small identifier to an antenna panel with a small identifier.

As shown in a dashed line block in FIG. 13, the above method may further include a step S13 of changing an ON/OFF state of each antenna panel based on the information.

In an example, the information may be acquired periodically. In another example, the above method further includes the following step of: acquiring MAC CE from the base station to activate or deactivate the antenna panel corresponding to the SRS resource set indicated by the information. In yet another example, the above method further includes the following step of: changing, based on DCI, an ON/OFF state of an antenna panel corresponding to the SRS resource set indicated by the information.

In an example that the UE controls the ON/OFF state of the antenna panel, the UE transmits a request for configuring an SRS resource set for beam management to the base station in a case that a particular antenna panel is turned on, and transmits a request for releasing the SRS resource set corresponding to the particular antenna panel to the base station in a case that the particular antenna panel is turned off. These requests may be transmitted through RRC signaling.

Alternatively, the UE transmits a request for activating the SRS resource set for beam management to the base station in the case that the particular antenna panel is turned on, and transmits a request for deactivating the SRS resource set corresponding to the particular antenna panel to the base station in the case that the particular antenna panel is turned off. These requests may be transmitted through MAC signaling.

These requests may each include an identifier of the SRS resource set that has a mapping relationship with the particular antenna panel.

Figure 14:
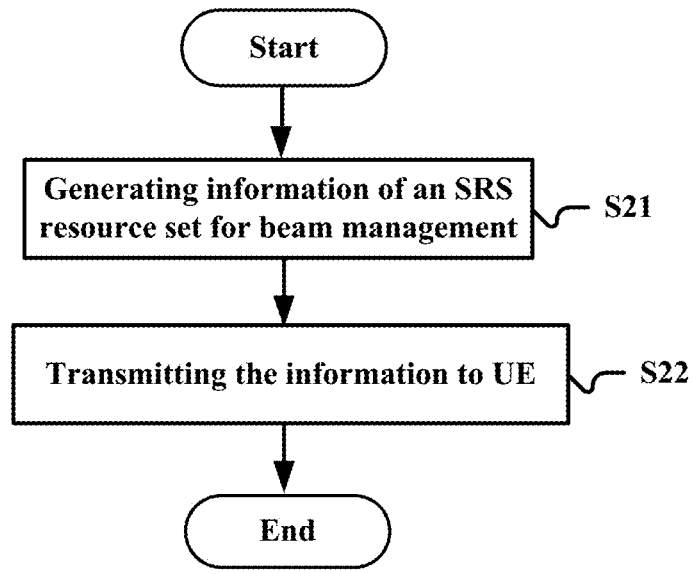
FIG. 14 shows a flowchart of a method for wireless communications according to another embodiment of the present disclosure.

FIG. 14 shows a flowchart of a method for wireless communications according to another embodiment of the present disclosure. The method includes: generating information of an SRS resource set for beam management configured for UE (S21), where there is a mapping relationship defined by a predetermined rule between the SRS resource set indicated by the information and an antenna panel of the UE; and transmitting the information to the UE (S22). This method may be performed at a side of the base station.

The predetermined rule may include: mapping an SRS resource set with a small identifier to an antenna panel with a small identifier. In step S22, the information may be transmitted through RRC signaling. In an example, the information may be transmitted periodically.

The above method may further include the following steps of: instructing the UE to activate or deactivate an antenna panel corresponding to the SRS resource set indicated by the information through MAC CE; or instructing the UE to change an ON/OFF state of an antenna panel corresponding to the SRS resource set indicated by the information through the DCI.

Figure 15:
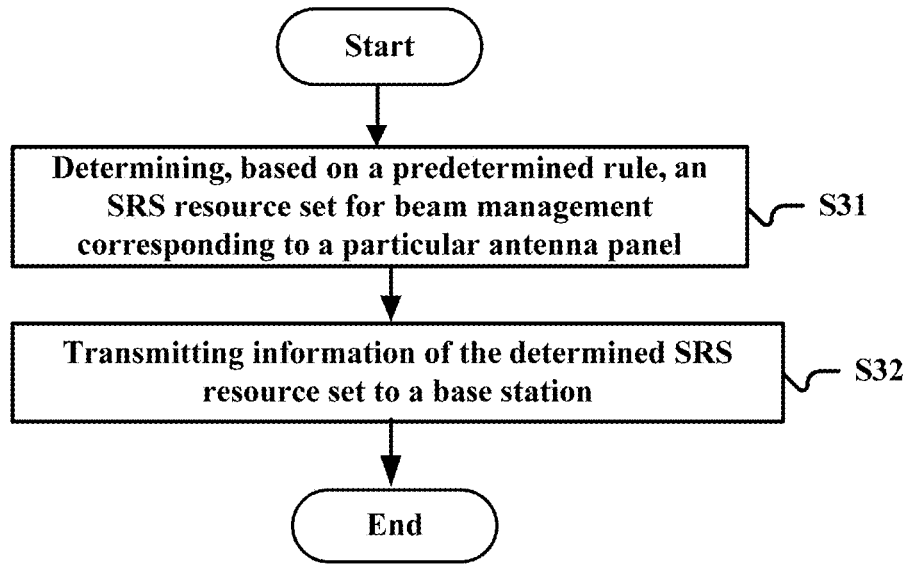
FIG. 15 shows a flowchart of a method for wireless communications according to another embodiment of the present disclosure.

FIG. 15 is a flowchart of a method for wireless communications according to another embodiment of the present disclosure. The method includes: determining, based on a predetermined rule, an SRS resource set for beam management corresponding to a particular antenna panel of the UE (S31), where the predetermined rule defines a mapping relationship between the SRS resource set for beam management and the antenna panel of the UE; and transmitting information of the determined SRS resource set to the base station (S32). This method may be performed at a side of the UE.

In an example, the particular antenna panel may be determined based on a measurement result of a downlink reference signal. In step S32, an identifier of the SRS resource set corresponding to the determined particular antenna panel is included in the measurement report for the downlink reference signal and is transmitted to the base station. The downlink reference signal is, for example, a CSI-RS or SSB. In step S31, the determining may be performed based on a historically configured SRS resource set.

Figure 16:
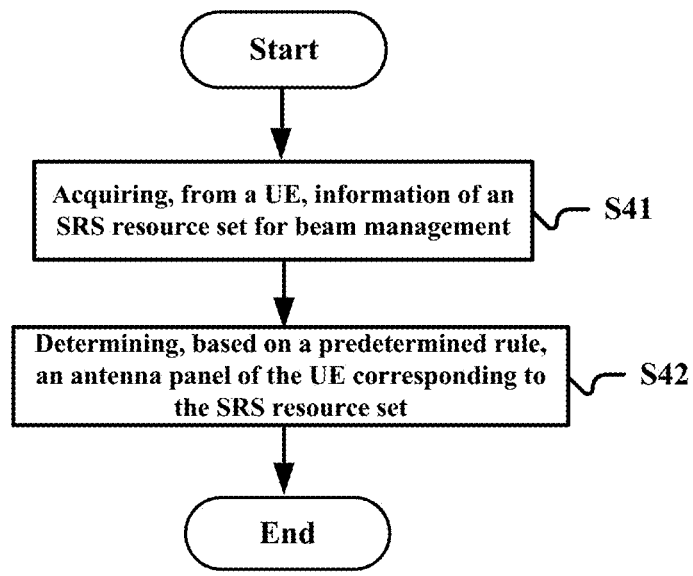
FIG. 16 shows a flowchart of a method for wireless communications according to another embodiment of the present disclosure.

FIG. 16 is a flowchart of a method for wireless communications according to another embodiment of the present disclosure. The method includes: acquiring, from user equipment, information of an SRS resource set for beam management (S41); and determining, based on a predetermined rule, an antenna panel of the UE corresponding to the SRS resource set indicated by the information, where the predetermined rule defines a mapping relationship between the SRS resource set for beam management and the antenna panel of the UE. This method may be performed at a side of the base station.

For example, the information is included in a measurement report for a downlink reference signal reported by the UE, and the information is an identifier of the SRS resource set. The above method may further include: configuring an SRS resource set for the UE based on the determined antenna panel.

It should be noted that, the above methods may be used in combination or separately, which are described in detail in the first to third embodiments, and are not repeated here.

The technology according to the present disclosure is applicable to various products.

For example, the electronic apparatus 200 and the electronic apparatus 400 may be implemented as various base stations. The base station may be implemented as any type of evolved node B (eNB) or gNB (5G base station). The eNB includes, for example, a macro eNB and a small eNB. The small eNB may be an eNB covering a cell smaller than a macro cell, such as a pico eNB, a micro eNB, and a home (femto) eNB. The case for the gNB is similar to the above. Alternatively, the base station may be implemented as any other type of base station, such as a NodeB and a base transceiver station (BTS). The base station may include: a main body (also referred to as a base station apparatus) configured to control wireless communication; and one or more remote wireless head ends (RRH) located at positions different from the main body. In addition, various types of user equipment may each serves as a base station by performing functions of the base station temporarily or semi-permanently.

The electronic apparatus 100 and electronic apparatus 300 may be implemented as various user equipments. The user equipment may be implemented as a mobile terminal (such as a smartphone, a tablet personal computer (PC), a notebook PC, a portable game terminal, a portable/dongle mobile router, and a digital camera) or a vehicle terminal (such as a vehicle navigation apparatus). The user equipment may also be implemented as a terminal that performs machine-to-machine (M2M) communication (also referred to as a machine type communication (MTC) terminal). Furthermore, the user equipment may be a wireless communication module (such as an integrated circuitry module including a single die) mounted on each of the terminals described above.

[Application Example Regarding a Base Station]

First Application Example

Figure 17:
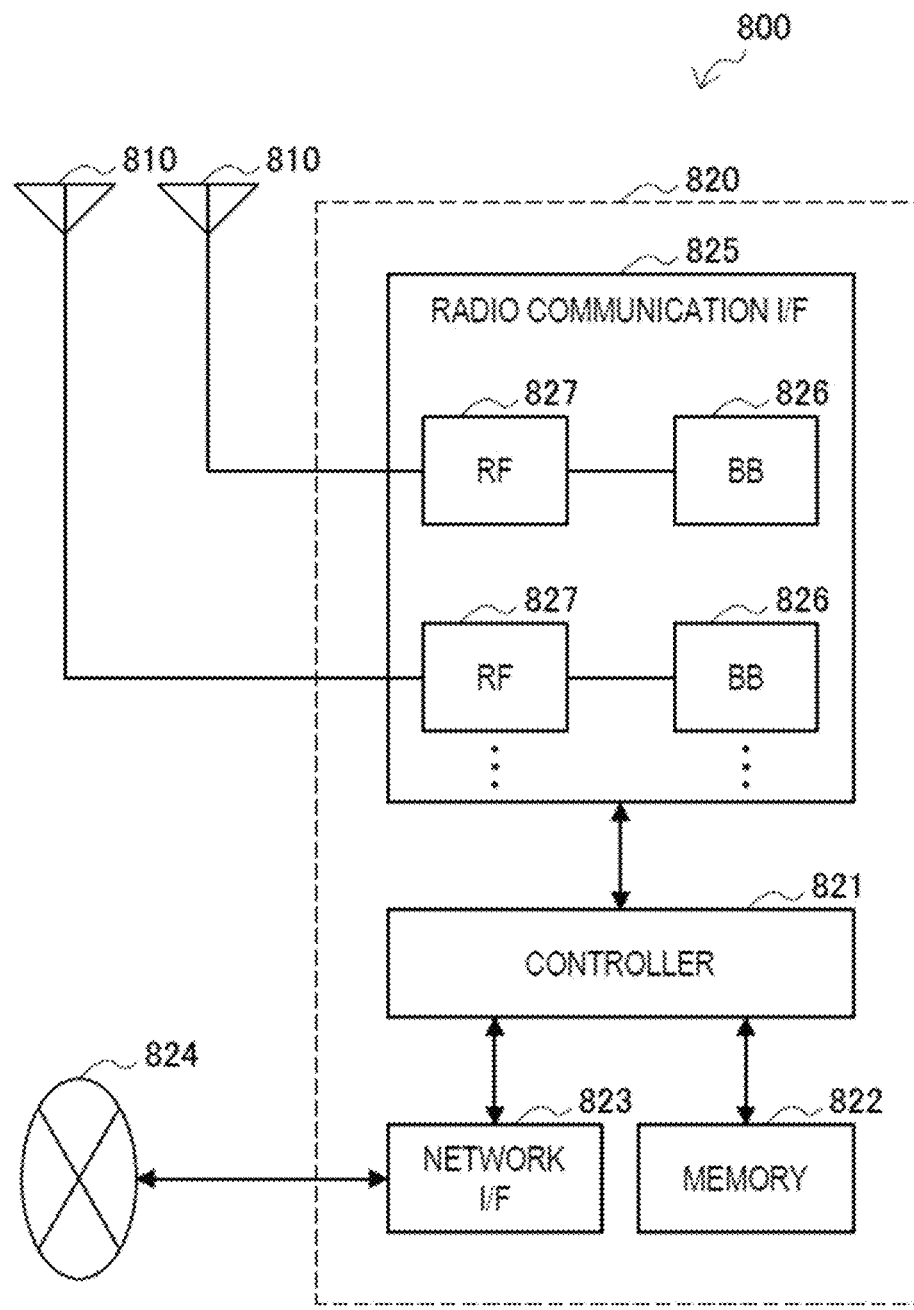
FIG. 17 is a block diagram showing a first example of an exemplary configuration of an eNB or gNB to which the technology according to the present disclosure may be applied.

FIG. 17 is a block diagram showing a first example of an exemplary configuration of an eNB or gNB to which technology according to the present disclosure may be applied. It should be noted that the following description is given by taking the eNB as an example, which is also applicable to the gNB. An eNB 800 includes one or more antennas 810 and a base station apparatus 820. The base station apparatus 820 and each of the antennas 810 may be connected to each other via a radio frequency (RF) cable.

Each of the antennas 810 includes a single or multiple antennal elements (such as multiple antenna elements included in a multiple-input multiple-output (MIMO) antenna), and is used for the base station apparatus 820 to transmit and receive wireless signals. As shown in FIG. 17, the eNB 800 may include the multiple antennas 810. For example, the multiple antennas 810 may be compatible with multiple frequency bands used by the eNB 800. Although FIG. 17 shows the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control and scheduling. The control may be performed in corporation with an eNB or a core network node in the vicinity. The memory 822 includes a RAM and a ROM, and stores a program executed by the controller 821 and various types of control data (such as terminal list, transmission power data and scheduling data).

The network interface 823 is a communication interface for connecting the base station apparatus 820 to a core network 824. The controller 821 may communicate with a core network node or another eNB via the network interface 823. In this case, the eNB 800, and the core network node or another eNB may be connected to each other via a logic interface (such as an S1 interface and an X2 interface). The network interface 823 may also be a wired communication interface or a wireless communication interface for wireless backhaul. If the network interface 823 is a wireless communication interface, the network interface 823 may use a higher frequency band for wireless communication than that used by the radio communication interface 825.

The radio communication interface 825 supports any cellular communication scheme (such as Long Term Evolution (LTE) and LTE-advanced), and provides wireless connection to a terminal located in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, Media Access Control (MAC), Radio Link Control (RLC), and a Packet Data Convergence Protocol (PDCP)). The BB processor 826 may have a part or all of the above-described logical functions instead of the controller 821. The BB processor 826 may be a memory storing communication control programs, or a module including a processor and a related circuit configured to execute the programs. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives wireless signals via the antenna 810.

As shown in FIG. 17, the radio communication interface 825 may include the multiple BB processors 826. For example, the multiple BB processors 826 may be compatible with multiple frequency bands used by the eNB 800. The radio communication interface 825 may include multiple RF circuits 827, as shown in FIG. 17. For example, the multiple RF circuits 827 may be compatible with multiple antenna elements. Although FIG. 17 shows the example in which the radio communication interface 825 includes the multiple BB processors 826 and the multiple RF circuits 827, the radio communication interface 825 may also include a single BB processor 826 and a single RF circuit 827.

In the eNB 800 shown in FIG. 17, transceivers of the electronic apparatus 200 and the electronic apparatus 400 as well as the transmitting unit 202 of the electronic apparatus 200 may be implemented by the radio communication interface 825. At least a part of functions may be implemented by the controller 821. For example, the controller 821 may configure the SRS resource sets for the UE by performing functions of the generating unit 201 and the transmitting unit 202, and may determine the particular antenna panel based on the information of the SRS resource sets for beam management by performing functions of the acquiring unit 401 and the determining unit 402.

Second Application Example

Figure 18:
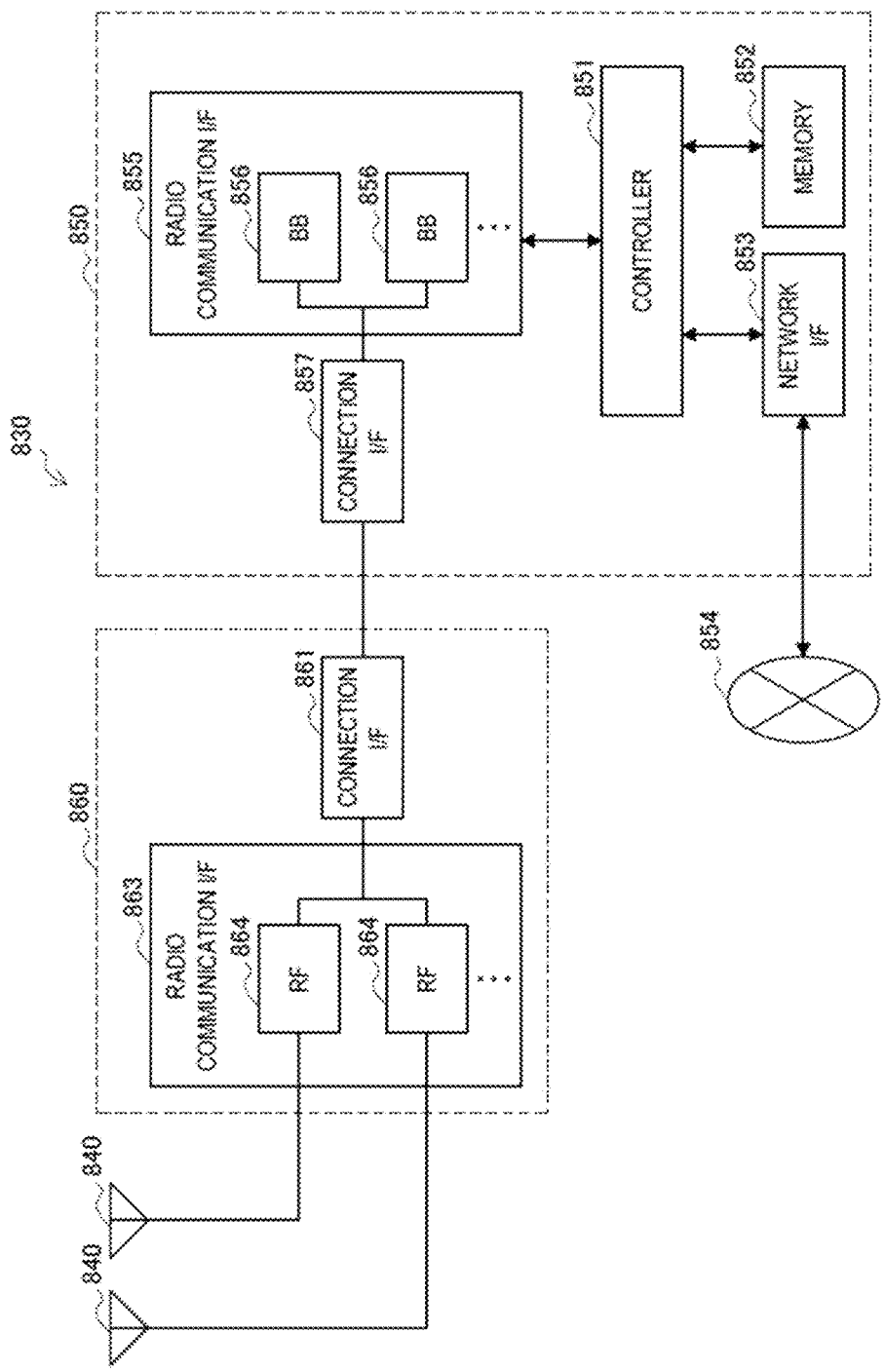
FIG. 18 is a block diagram showing a second example of an exemplary configuration of the eNB or gNB to which the technology according to the present disclosure may be applied.

FIG. 18 is a block diagram showing a second example of the exemplary configuration of an eNB or gNB to which the technology according to the present disclosure may be applied. It should be noted that the following description is given by taking the eNB as an example, which is also applied to the gNB. An eNB 830 includes one or more antennas 840, a base station apparatus 850, and an RRH 860. The RRH 860 and each of the antennas 840 may be connected to each other via an RF cable. The base station apparatus 850 and the RRH 860 may be connected to each other via a high speed line such as an optical fiber cable.

Each of the antennas 840 includes a single or multiple antennal elements (such as multiple antenna elements included in an MIMO antenna), and is used for the RRH 860 to transmit and receive wireless signals. As shown in FIG. 18, the eNB 830 may include the multiple antennas 840. For example, the multiple antennas 840 may be compatible with multiple frequency bands used by the eNB 830. Although FIG. 18 shows the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 17.

The radio communication interface 855 supports any cellular communication scheme (such as LTE and LTE-advanced), and provides wireless communication to a terminal located in a sector corresponding to the RRH 860 via the RRH 860 and the antenna 840. The radio communication interface 855 may typically include, for example, a BB processor 856. The BB processor 856 is the same as the BB processor 826 described with reference to FIG. 17, except that the BB processor 856 is connected to an RF circuit 864 of the RRH 860 via the connection interface 857. As show in FIG. 18, the radio communication interface 855 may include the multiple BB processors 856. For example, the multiple BB processors 856 may be compatible with multiple frequency bands used by the eNB 830. Although FIG. 18 shows the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives wireless signals via the antenna 840. The radio communication interface 863 may typically include, for example, the RF circuit 864. The RF circuit 864 may include, for example, a mixer, a filter and an amplifier, and transmits and receives wireless signals via the antenna 840. The radio communication interface 863 may include multiple RF circuits 864, as shown in FIG. 18. For example, the multiple RF circuits 864 may support multiple antenna elements. Although FIG. 18 shows the example in which the radio communication interface 863 includes the multiple RF circuits 864, the radio communication interface 863 may also include a single RF circuit 864.

In the eNB 800 shown in FIG. 18, transceivers of the electronic apparatus 200 and the electronic apparatus 400 as well as the transmitting unit 202 of the electronic apparatus 200 may be implemented by the radio communication interface 855 and/or radio communication interface 863. At least a part of functions may be implemented by the controller 851. For example, the controller 851 may configure the SRS resource sets for the UE by performing functions of the generating unit 201 and the transmitting unit 202, and may determine the particular antenna panel based on the information of the SRS resource sets for beam management by performing functions of the acquiring unit 401 and the determining unit 402.

[Application Example Regarding User Equipment]

First Application Example

Figure 19:
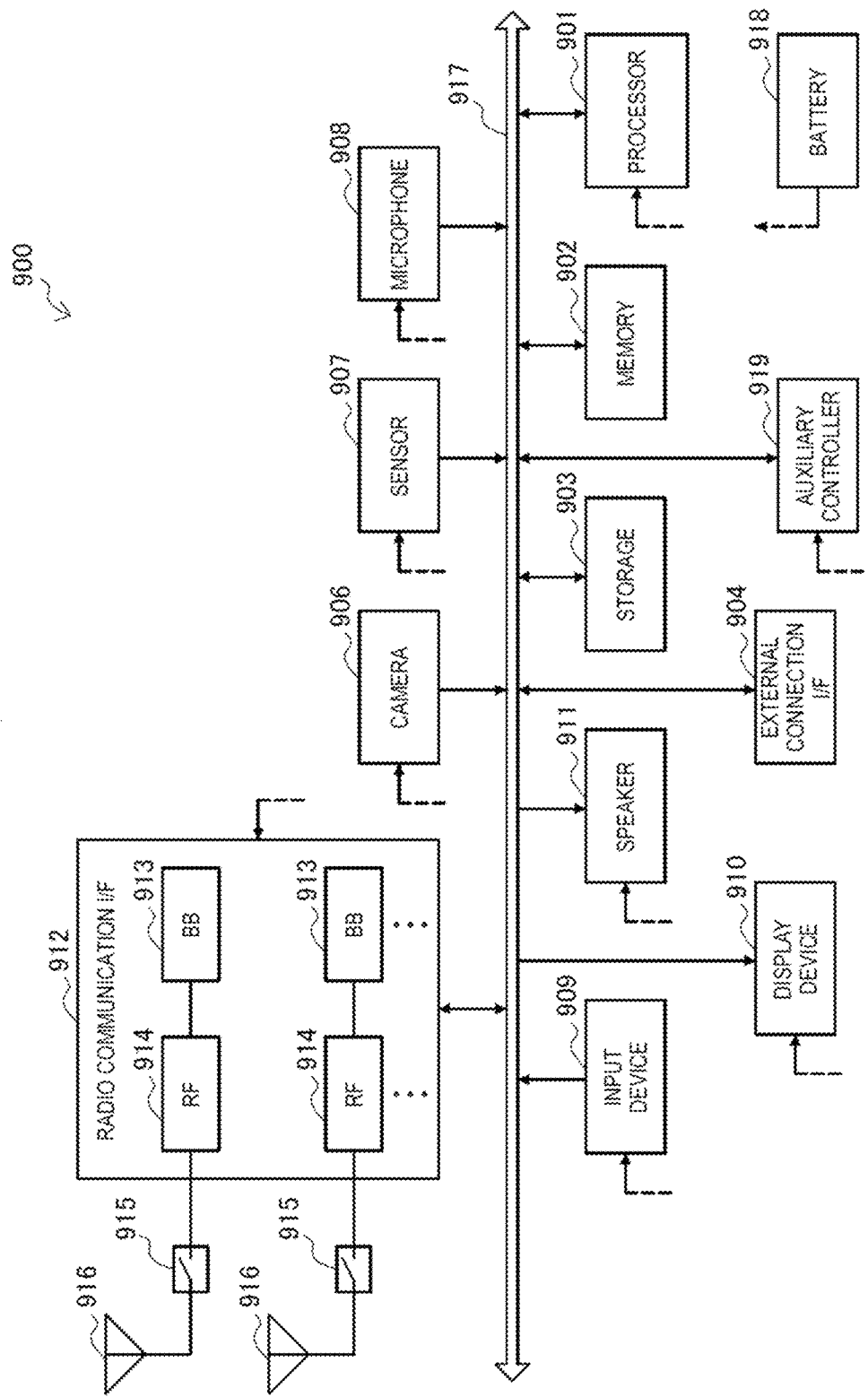
FIG. 19 is a block diagram showing an example of an exemplary configuration of a smartphone to which the technology according to the present disclosure may be applied.

FIG. 19 is a block diagram showing an exemplary configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes a RAM and a ROM, and stores a program executed by the processor 901 and data. The storage 903 may include a storage medium such as a semiconductor memory and a hard disk. The external connection interface 904 is an interface for connecting an external device (such as a memory card and a universal serial bus (USB) device) to the smartphone 900.

The camera 906 includes an image sensor (such as a charge coupled device (CCD) and a complementary metal oxide semiconductor (CMOS)), and generates a captured image. The sensor 907 may include a group of sensors, such as a measurement sensor, a gyro sensor, a geomagnetism sensor, and an acceleration sensor. The microphone 908 converts sounds that are inputted to the smartphone 900 to audio signals. The input device 909 includes, for example, a touch sensor configured to detect touch onto a screen of the display device 910, a keypad, a keyboard, a button, or a switch, and receives an operation or information inputted from a user. The display device 910 includes a screen (such as a liquid crystal display (LCD) and an organic light-emitting diode (OLED) display), and displays an output image of the smartphone 900. The speaker 911 converts audio signals that are outputted from the smartphone 900 to sounds.

The radio communication interface 912 supports any cellular communication scheme (such as LTE and LTE-advanced), and performs a wireless communication. The radio communication interface 912 may include, for example, a BB processor 913 and an RF circuit 914. The BB processor 913 may perform, for example, encoding/decoding, modulating/demodulating, and multiplexing/de-multiplexing, and perform various types of signal processing for wireless communication. The RF circuit 914 may include, for example, a mixer, a filter and an amplifier, and transmits and receives wireless signals via the antenna 916. It should be noted that although FIG. 19 shows a case that one RF link is connected to one antenna, which is only illustrative, and a case that one RF link is connected to multiple antennas through multiple phase shifters may also exist. The radio communication interface 912 may be a chip module having the BB processor 913 and the RF circuit 914 integrated thereon. The radio communication interface 912 may include multiple BB processors 913 and multiple RF circuits 914, as shown in FIG. 19. Although FIG. 19 shows the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of wireless communication scheme such as a short-distance wireless communication scheme, a near field communication scheme, and a radio local area network (LAN) scheme. In this case, the radio communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the radio communication interface 912.

Each of the antennas 916 includes a single or multiple antenna elements (such as multiple antenna elements included in an MIMO antenna) and is used for the radio communication interface 912 to transmit and receive wireless signals. The smartphone 900 may include the multiple antennas 916, as shown in FIG. 19. Although FIG. 19 shows the example in which the smartphone 900 includes the multiple antennas 916, the smartphone 900 may also include a single antenna 916.

Furthermore, the smartphone 900 may include the antenna 916 for each wireless communication scheme. In this case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smart phone 900 shown in FIG. 19 via feeder lines that are partially shown as dashed lines in FIG. 19. The auxiliary controller 919, operates a minimum necessary function of the smart phone 900, for example, in a sleep mode.

In the smartphone 900 shown in FIG. 19, transceivers of the electronic apparatuses 100 and 300 and the transmitting units 103, 302 may be implemented by the radio communication interface 912. At least a part of functions may be implemented by the processor 901 or the auxiliary controller 919. For example, the processor 901 or the auxiliary controller 919 may determine the antenna panel of the UE corresponding to the SRS resource sets by performing functions of the acquiring unit 101 and the determining unit 102, and may determine the SRS resource sets for beam management corresponding to the particular antenna panel by performing functions of the determining unit 301.

Second Application Example

Figure 20:
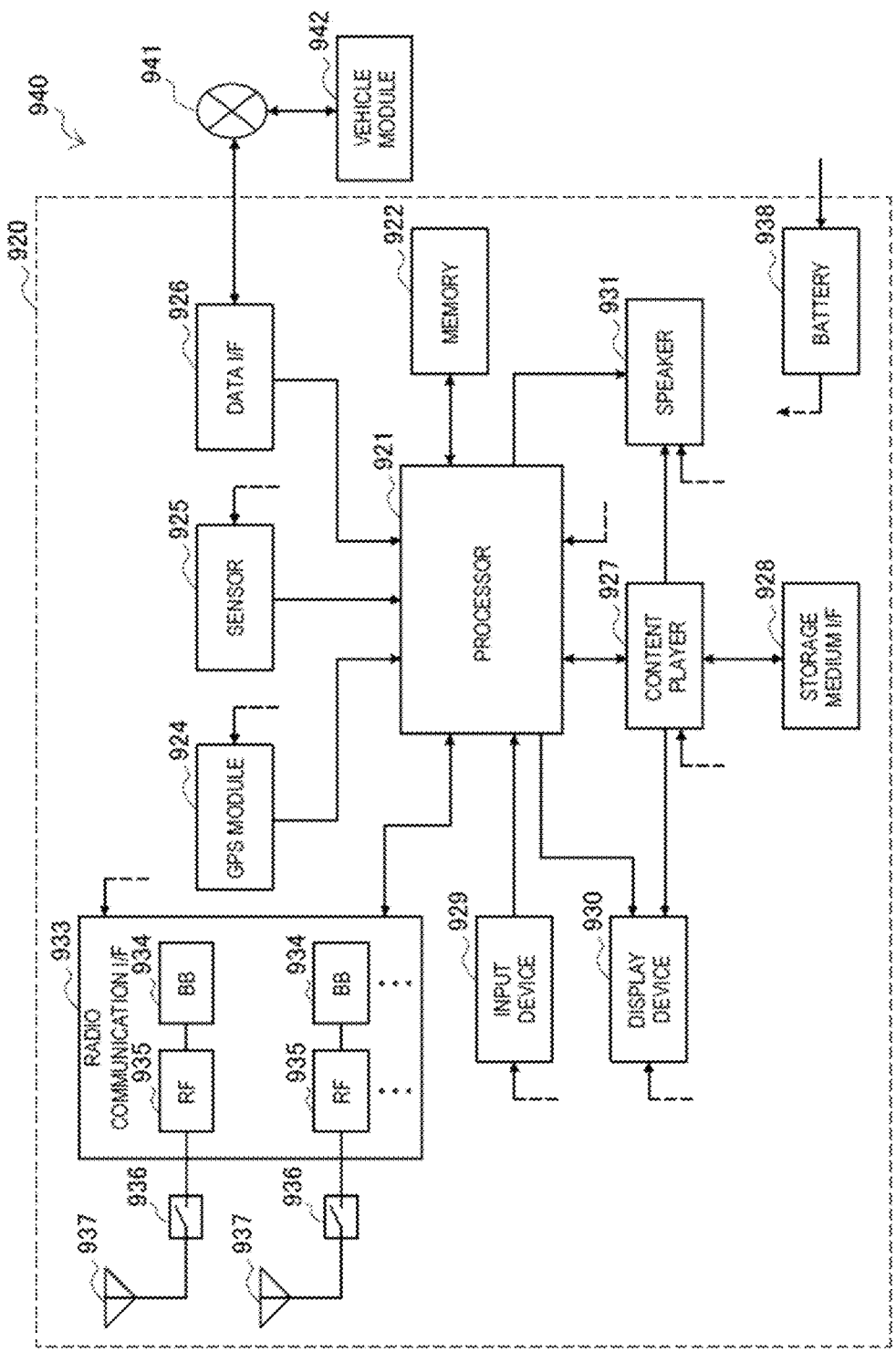
FIG. 20 is a block diagram showing an example of an exemplary configuration of a car navigation apparatus to which the technology according to the present disclosure may be applied.

FIG. 20 is a block diagram showing an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example a CPU or a SoC, and controls a navigation function and additional function of the car navigation apparatus 920. The memory 922 includes RAM and ROM, and stores a program that is executed by the processor 921, and data.

The GPS module 924 determines a position (such as latitude, longitude and altitude) of the car navigation apparatus 920 by using GPS signals received from a GPS satellite. The sensor 925 may include a group of sensors such as a gyro sensor, a geomagnetic sensor and an air pressure sensor. The data interface 926 is connected to, for example, an in-vehicle network 941 via a terminal that is not shown, and acquires data (such as vehicle speed data) generated by the vehicle.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or information inputted from a user. The display device 930 includes a screen such as an LCD or OLED display, and displays an image of the navigation function or content that is reproduced. The speaker 931 outputs a sound for the navigation function or the content that is reproduced.

The radio communication interface 933 supports any cellular communication scheme (such as LTE and LTE-Advanced), and performs wireless communication. The radio communication interface 933 may typically include, for example, a BB processor 934 and an RF circuit 935. The BB processor 934 may perform, for example, encoding/decoding, modulating/demodulating and multiplexing/de-multiplexing, and perform various types of signal processing for wireless communication. The RF circuit 935 may include, for example, a mixer, a filter and an amplifier, and transmits and receives wireless signals via the antenna 937. The radio communication interface 933 may also be a chip module having the BB processor 934 and the RF circuit 935 integrated thereon. The radio communication interface 933 may include multiple BB processors 934 and multiple RF circuits 935, as shown in FIG. 20. Although FIG. 20 shows the example in which the radio communication interface 933 includes the multiple BB processors 934 and the multiple RF circuits 935, the radio communication interface 933 may also include a single BB processor 934 and a single RF circuit 935.

Furthermore, in addition to a cellular communication scheme, the radio communication interface 933 may support another type of wireless communication scheme such as a short-distance wireless communication scheme, a near field communication scheme, and a wireless LAN scheme. In this case, the radio communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the radio communication interface 933.

Each of the antennas 937 includes a single or multiple antenna elements (such as multiple antenna elements included in an MIMO antenna), and is used by the radio communication interface 933 to transmit and receive wireless signals. As shown in FIG. 20, the car navigation apparatus 920 may include the multiple antennas 937. Although FIG. 20 shows the example in which the car navigation apparatus 920 includes the multiple antennas 937, the car navigation apparatus 920 may also include a single antenna 937.

Furthermore, the car navigation apparatus 920 may include the antenna 937 for each wireless communication scheme. In this case, the antenna switches 936 may be omitted from the configuration of the car navigation apparatus 920.

The battery 938 supplies power to the blocks of the car navigation apparatus 920 shown in FIG. 20 via feeder lines that are partially shown as dash lines in FIG. 20. The battery 938 accumulates power supplied from the vehicle.

In the car navigation apparatus 920 shown in FIG. 20, transceivers of the electronic apparatuses 100 and 300 and the transmitting units 103, 302 may be implemented by the radio communication interface 933. At least a part of functions may be implemented by the processor 921. For example, the processor 921 may determine the antenna panel of the UE corresponding to the SRS resource sets by performing functions of the acquiring unit 101 and the determining unit 102, and may determine the SRS resource sets for beam management corresponding to the particular antenna panel by performing functions of the determining unit 301.

The technology of the present disclosure may also be implemented as an in-vehicle system (or a vehicle) 940 including one or more blocks of the car navigation apparatus 920, the in-vehicle network 941 and a vehicle module 942. The vehicle module 942 generates vehicle data (such as a vehicle speed, an engine speed, and failure information), and outputs the generated data to the in-vehicle network 941.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 2100 shown in FIG. 21) from a storage medium or network, wherein the computer is capable of implementing various functions when installed with various programs.

Figure 21:
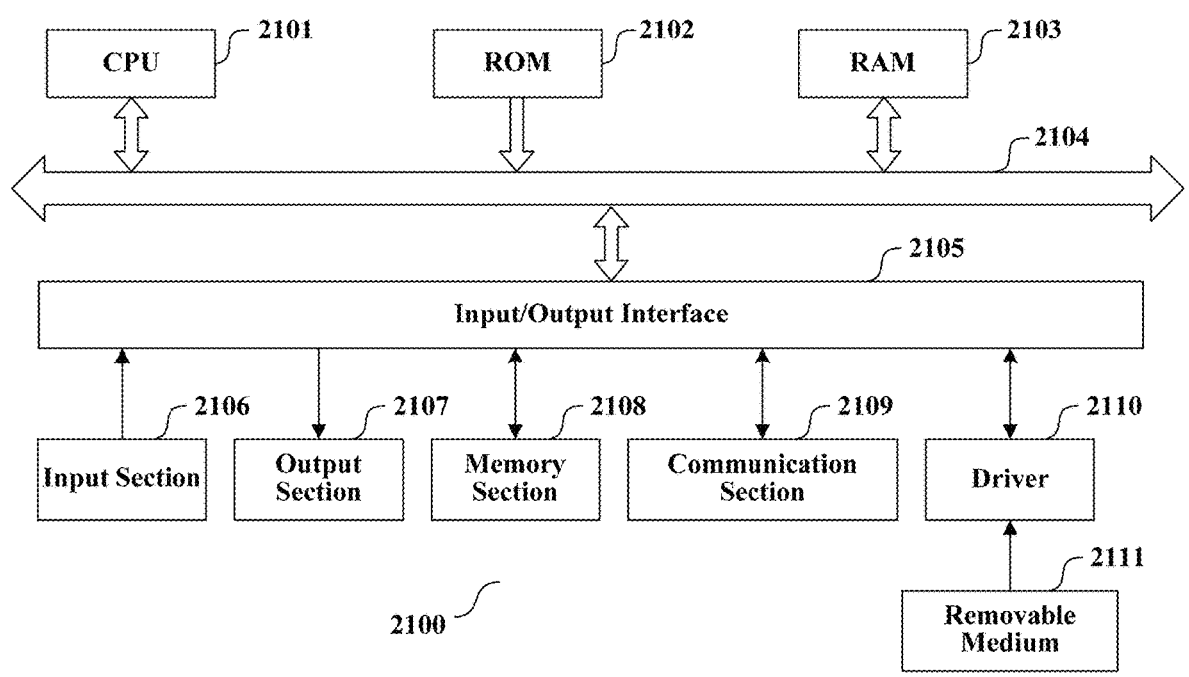
FIG. 21 is a block diagram of an exemplary block diagram illustrating the structure of a general purpose personal computer capable of realizing the method and/or device and/or system according to the embodiments of the present disclosure.

In FIG. 21, a central processing unit (CPU) 2101 executes various processing according to a program stored in a read-only memory (ROM) 2102 or a program loaded to a random access memory (RAM) 2103 from a memory section 2108. The data needed for the various processing of the CPU 2101 may be stored in the RAM 2103 as needed. The CPU 2101, the ROM 2102 and the RAM 2103 are linked with each other via a bus 2104. An input/output interface 2105 is also linked to the bus 2104.

The following components are linked to the input/output interface 2105: an input section 2106 (including keyboard, mouse and the like), an output section 2107 (including displays such as a cathode ray tube (CRT), a liquid crystal display (LCD), a loudspeaker and the like), a memory section 2108 (including hard disc and the like), and a communication section 2109 (including a network interface card such as a LAN card, modem and the like). The communication section 2109 performs communication processing via a network such as the Internet. A driver 2110 may also be linked to the input/output interface 2105, if needed. If needed, a removable medium 2111, for example, a magnetic disc, an optical disc, a magnetic optical disc, a semiconductor memory and the like, may be installed in the driver 2110, so that the computer program read therefrom is installed in the memory section 2108 as appropriate.

In the case where the foregoing series of processing is achieved through software, programs forming the software are installed from a network such as the Internet or a memory medium such as the removable medium 2111.

It should be appreciated by those skilled in the art that the memory medium is not limited to the removable medium 2111 shown in FIG. 21, which has program stored therein and is distributed separately from the apparatus so as to provide the programs to users. The removable medium 2111 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 2102 and the memory section 2108 in which programs are stored, and can be distributed to users along with the device in which they are incorporated.

To be further noted, in the apparatus, method and system according to the present disclosure, the respective components or steps can be decomposed and/or recombined. These decompositions and/or recombinations shall be regarded as equivalent solutions of the disclosure. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic apparatus for wireless communications, comprising:
   processing circuitry, configured to:
   acquire, from a base station, information of a sounding reference signal (SRS) resource set for beam management configured by the base station for user equipment;
   determine, based on a predetermined rule, an antenna panel of the user equipment corresponding to the SRS resource set indicated by the information, wherein the predetermined rule defines a mapping relationship between SRS resource sets for beam management and antenna panels of the user equipment;
   transmit a request for configuring the SRS resource set for beam management to the base station in a case that a particular antenna panel is turned on; and
   transmit a request for releasing the SRS resource set corresponding to the particular antenna panel to the base station in a case that the particular antenna panel is turned off.

2. The electronic apparatus according to claim 1, wherein the processing circuitry is configured to acquire the information through radio resource control (RRC) signaling.

3. The electronic apparatus according to claim 2, wherein the processing circuitry is configured to acquire the information periodically; or
   wherein the processing circuitry is further configured to acquire, form the base station, MAC CE to activate or deactivate the antenna panel corresponding to the SRS resource set indicated by the information; or
   wherein the processing circuitry is configured to change, based on downlink control information, an ON/OFF state of the antenna panel corresponding to the SRS resource set indicated by the information.

4. The electronic apparatus according to claim 1, wherein the processing circuitry is further configured to change an ON/OFF state of each antennal panel based on the information.

5. The electronic apparatus according to claim 1, wherein the predetermined rule comprises: mapping an SRS resource set with a small identifier to an antenna panel with a small identifier.

6. The electronic apparatus according to claim 1, wherein the processing circuitry is further configured to transmit a request for activating the SRS resource set for beam management to the base station in the case that the particular antenna panel is turned on; and transmit a request for deactivating the SRS resource set corresponding to the particular antenna panel to the base station in the case that the particular antenna panel is turned off.

7. The electronic apparatus according to claim 6, wherein the processing circuitry is configured to transmit the request based on MAC signaling.

8. The electronic apparatus according to claim 1, wherein the processing circuitry is configured to transmit the request through the RRC signaling.

9. The electronic apparatus according to claim 1, wherein the request comprises an identifier of the SRS resource set having a mapping relationship with the particular antenna panel.

10. An electronic apparatus for wireless communications, comprising:
    processing circuitry, configured to:
    generate information of a sounding reference signal (SRS) resource set for beam management configured for user equipment, wherein there is mapping relationship defined by a predetermined rule between the SRS resource set indicated by the information and an antenna panel of the user equipment;
    transmit the information to the user equipment;
    transmit a request for configuring the SRS resource set for beam management to a base station in a case that a particular antenna panel is turned on; and
    transmit a request for releasing the SRS resource set corresponding to the particular antenna panel to the base station in a case that the particular antenna panel is turned off.

11. The electronic apparatus according to claim 10, wherein the predetermined rule comprises: mapping an SRS resource set with a small identifier to an antenna panel with a small identifier.

12. The electronic apparatus according to claim 10, wherein the processing circuitry is configured to transmit the information through RRC signaling.

13. The electronic apparatus according to claim 12, wherein the processing circuitry is further configured to instruct the user equipment to activate or deactivate an antenna panel corresponding to the SRS resource set indicated by the information through MAC CE; or
    wherein the processing circuitry is further configured to instruct the user equipment to change an ON/OFF state of an antenna panel corresponding to the SRS resource set indicated by the information through downlink control information.

14. The electronic apparatus according to claim 12, wherein the processing circuitry is configured to transmit the information periodically.

15. An electronic apparatus for wireless communications, comprising:
    processing circuitry, configured to:
    determine, based on a predetermined rule, a sounding reference signal (SRS) resource set for beam management corresponding to a particular antenna panel of user equipment, wherein the predetermined rule defines a mapping relationship between SRS resource sets for beam management and antenna panels of the user equipment;

transmit information of the determined SRS resource set to a base station;

transmit a request for configuring the SRS resource set for beam management to the base station in a case that a particular antenna panel is turned on; and transmit a request for releasing the SRS resource set corresponding to the particular antenna panel to the base station in a case that the particular antenna panel is turned off.

16. The electronic apparatus according to claim 15, wherein the processing circuitry is configured to determine the particular antenna panel based on a measurement result of a downlink reference signal, and comprise an identifier of the SRS resource set corresponding to the determined particular antenna panel in a measurement report of the downlink reference signal and transmit the identifier to the base station.

17. The electronic apparatus according to claim 16, wherein the downlink reference signal is a channel state information reference signal or a synchronization signal block.

18. The electronic apparatus according to claim 15, wherein the predetermined rule comprises: mapping an SRS resource set with a small identifier to an antenna panel with a small identifier.

19. The electronic apparatus according to claim 15, wherein the processing circuitry is configured to perform the determining based on a historically configured SRS resource set.

* * * * *